Dec. 30, 1958  A. GODEL  2,866,696
PROCESS FOR THE GASIFICATION OF GRANULATED FLUIDIZED BED
OF CARBONACEOUS MATERIAL, OVER MOVING,
SLOPING, HORIZONTAL, CONTINUOUS GRATE
Filed Oct. 28, 1954

INVENTOR.
Albert Godel
BY Richards & Geier
ATTORNEYS

United States Patent Office 2,866,696
Patented Dec. 30, 1958

2,866,696

PROCESS FOR THE GASIFICATION OF GRANULATED FLUIDIZED BED OF CARBONACEOUS MATERIAL, OVER MOVING, SLOPING, HORIZONTAL, CONTINUOUS GRATE

Albert Godel, Paris, France, assignor to Compagnie Industrielle de Procedes et d'Applications S. A., Fribourg, Switzerland, a corporation of Switzerland Application October 28, 1954, Serial No. 465,384

Claims priority, application France October 29, 1953

2 Claims. (Cl. 48—203)

The present invention relates to improvements in a method of obtaining reactions between solid granulated substances maintained in a fluid state.

The use of the customary fluidization reactors entails drawbacks when the reaction products tend to become fusible in the reaction temperature and to form compact agglomerated masses, since these latter coat the lateral wall with injurious scorifications and, since it is not possible to maintain them in aerodynamic suspension, they become settled at the bottom of the reactor, where, owing to their accumulation, they obstruct the blowing orifices.

This drawback is particularly serious in gasification reactions, combustion reactions or in the coking carbonisation reactions of fuels, as the clinkers or large fragments of coke rapidly obstruct the grating.

An object of the present invention is to obviate these drawbacks. For this purpose, it provides, in the main, a process for producing chemical reactions in granulated materials maintained in gaseous suspension, particularly in the fluidized phase, giving rise to the formation of solid masses which settle in said fluid, this process being essentially characterised by the fact that the granulated substance is maintained in fluidized layer hydrostatically equilibrated at all points of the reactor, the solid masses settling as a result of the chemical reaction being caused to accumulate at the base of this layer and then being sorted, after which they are extracted mechanically through the surface of said layer.

Generally speaking, in all cases, the means for carrying out the subject matter of the present invention include a conveying device, such as an endless continuous, mechanical grating, traversing the reactor on its path of travel, on which grating rest the granulated substances maintained in a fluidized layer by the insufflation of gas through the grating, the fluidized layer being hydrostatically equilibrated at all points of the reactor and extending as far as the point of emergence of the grating traversing the reactor, the intensity at which the gas is blown at each point of the grating being controlled in order to ensure regular fluidization and to enable the settled agglomerated masses to be taken along with it at the point of emergence, the fluidized granulated masses being left behind.

According to a preferred embodiment of the present invention, an endless band grating is used to support the fluidized bed, at least one portion of the endless band grating being inclined so that it emerges through the free upper surface of the fluidized layer.

It is also possible to extract the clinkers through said free upper surface by using an inclined shaking grating or an inclined helical extractor, or, finally, by replacing the grating altogether by an Archimedean screw.

The process, constituting the subject matter of the present invention, which pertains to obtaining chemical reactions, is particularly suitable for the combustion of coal fines for the heating of boilers. In that case, the agglomerated masses which are deposited at the bottom of the fluidized layer and which are moved by the transporting means, are the clinkers.

Practical experience has shown that the process, constituting the subject matter of the present invention, makes it possible to burn about 1500 to 2000 kilograms per hour per square meter of grating surface, which is of considerable advantage over the prior art methods, particularly since through the use of prior art horizontal grating, it is possible to burn only 150 kilograms per square meter per hour.

It is precisely for this reason that the grating of the present invention used for fluidization purposes is from 5 to 10 times smaller than that used in prior art, the grating of the present invention occupying only a central portion of the base of the fluidization reactor, and yet assuring adequate combustion.

The invention will appear more clearly from the following detailed description, when taken in connection with the accompanying drawing, showing, by way of example, preferred embodiments of the inventive idea:

Figure 1:
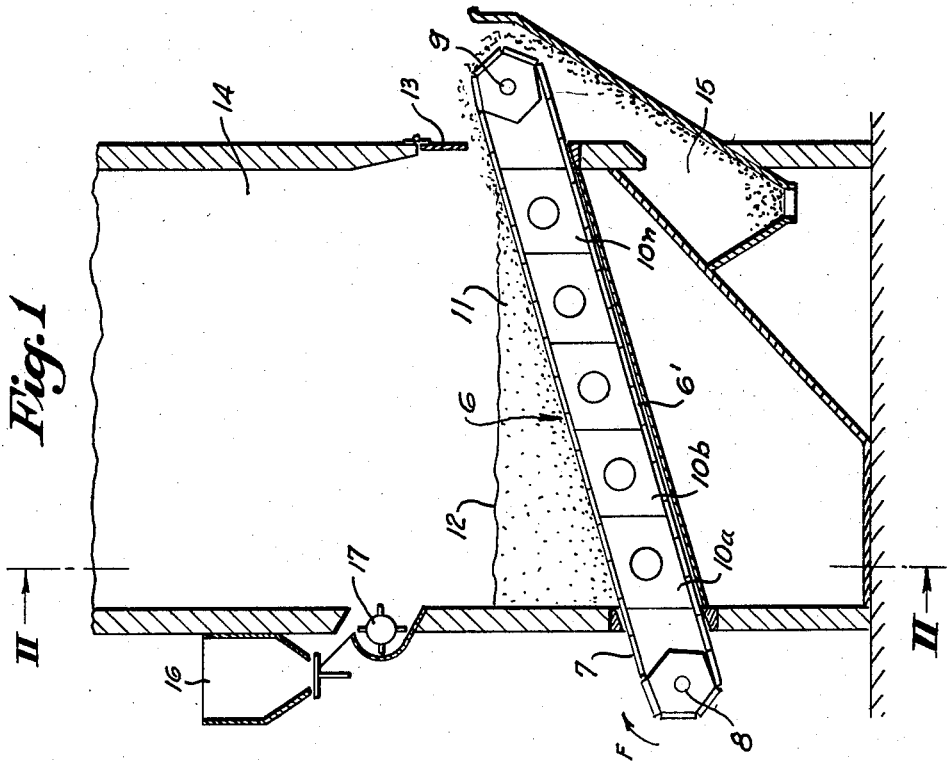
Figure 1 is a longitudinal section through an apparatus constructed in accordance with the present invention.
Figure 2:
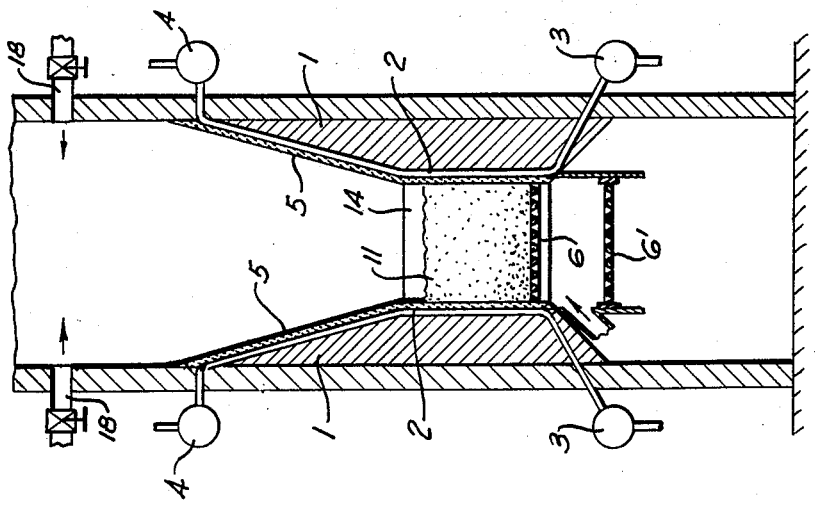
Figure 2 is a section along the line II—II of Figure 1.

Figures 1 and 2 show a fluidization reactor forming a combustion hearth and usable for the combustion of fuels. It is surmounted by a tubular boiler (not shown). This furnace is bounded laterally by walls 1 which are flared towards the top and cooled by vertical pipes 2 connected to feed collectors 3 and to vaporisation collectors 4; these pipes are covered by a wall of conductive cement 5 forming a water jacket to obviate adhesion.

The base of the furnace consists of the upper floor 6 of a mechanical grating 7 extending between a lower driving roller 8 and an upper driving roller 9. Between the upper side 6 and lower side 6' of this grating there are airboxes 10a . . . 10n, enabling the pressure of the air blowing across the grating to be suitably regulated. Thus, at the lower end, the pressure blown through boxes 10a is very much greater than the pressure of the gas blown through the box 10n at the upper end. In this manner, the fluidized layer 11 is enabled to retain a more or less uniform degree of fluidization, its free surface 12 remaining thus more or less horizontal.

An articulated shutter 13 isolates the combustion chamber proper 14 from the ash bin 15, while nevertheless giving access to the clinkers produced on the grating.

This mechanical grating is of the standard type, its floor generally consisting, as is well known, of cast iron bars nearly in contact with one another, giving access to the air between their respective surfaces. When the gradient of the grating is more than 25° with respect to the horizontal, however, it is necessary, in order to prevent the product from sliding, to provide these bars with projections in the form of grooves or teeth.

The distributor of "fines" is in the form of a hopper 16 feeding a shovel-wheel 17.

By way of an alternative (not shown), this latter may be replaced by a device for injecting "fines" by air-insufflation.

The device functions as follows:

The grating 7 is in motion, in the direction of the arrow F, at a constant speed; this movement brings about, not the fuel feed (as in the case of the known devices), but merely the evacuation of the clinkers. The insufflation through the various boxes is regulated in such a way that the fluidization is equally active at all points, whatever the depth of the fluidized "bed" 11, and without causing any appreciable quantities of combustible "fines" to be carried along. This ensures at the same time that the free surface is, as required, more or less horizontal.

To ensure a constant level in the latter, the amount of carbon particles distributed by the distributor-system is controlled by a regulator (not represented) connected to the level 12.

It has been found that if the depth of the fluidized layer is sufficient, the gases resulting from the fluidization consist for the greater part of producer gases. It is thus necessary to bring about complete combustion by introducing additional air at 18 above the hearth.

This two-stage combustion makes it possible to avoid excessive local temperature, while ensuring fully satisfactory heat transmission to the water pipes of the boiler.

According to the present invention, the fluidized "bed" in a state of ignition offers, owing to its thermal mass, the advantage of enabling the feeding to be carried out, without sticking and "packing," even if the "fines" are damp or of the "coking" type. It provides favorable conditions for the burning of untreated "fines," slurry and of anthracite "fines."

Naturally, it is essential that the fuels be well distributed over the surface by means of the shovel-wheel 17. The temperature of the fluidized layer may vary under normal conditions of combustion between 900° C. and 1200° C. more or less, since actually the temperatures depend upon the nature of the coal and fusibility of its ash contents.

Moreover, it is also possible to inject the "fines" directly into the fluidized layer, by means of any suitable device (not shown), provided that steps are taken to ensure their rapid contact with the fluidized products in state of ignition. Soot emanating from the "de-dusting" of the flue gases, which is to be recirculated, is mixed with the "fines."

The greater part of the ash of the coal is transformed into clinkers which are too heavy to participate in the fluidization and which are evacuated, by the ascending grating, through the free surface of the fluidized layer, which enables the separation of the clinker from the "fines" in a state of combustion and fluidization. In fact, it has been found that these clinkers are completely free of unburnt material, since the "fines" are being continually projected out of the grating and restored to suspension by the insufflation of air underneath the uncovered part of the grating.

It is possible to feed certain boxes of the grating with air charged with steam or flue gas; in order to reduce the temperature of the fluidized "bed" it is also possible to insufflate air pulsating alternately in certain boxes to improve fluidization. It should be noted that in the embodiment illustrated the fluidization grating is of reduced size at the base of the hearth and that the tubes 5 constituting water jackets covered with cement, form a bundle curving toward the center of the hearth, as indicated in Figure 2.

According to a modification not shown in Figure 2, the water jackets, i. e., the collectors 3 and 4 and the tubes 5 are eliminated entirely, the grating being connected to vertical side walls by a refractory support extending in the plane of the grating. The distance between the edges of this grate and the point where the lateral walls of the reactor intersect with the base of this latter are sufficient to ensure that an appreciable dead angle is formed, where fluidization cannot take place and in which embankment a chute-slope is naturally provided for non-fluidized granulated substances.

It has been found according to this invention that under these circumstances the surface of this slope is being continually renewed by the projection of fluidized substances to the upper part and by the movement of these substances to the grating.

It has also been found that the agglomerates resulting from this reaction flow out with greater rapidity, automatically accumulating on the grating, whence they can be evacuated by the means previously described.

The artificial production and the use of the falling banks offer the double advantage of producing a thermal insulation for the reactor and of isolating the lateral walls from any contact with the scoria, thus obviating the risk that these will adhere to them.

Naturally, the foregoing can only apply insofar as the granulated materials constituting the slope are free of any tendency to agglomerate at the temperature in question, which is the case with anthracite, coke, etc.

In order to limit the agglomeration of the granulated substances forming the slope, various means are provided within the scope of the present invention; a first method consists of cooling the slope by the insertion therein of cooling surfaces more or less parallel to the contact-surface of the non-fluidized mass and of the fluidized mass; a further method consists of entirely or partially feeding the granulated substances to the reactor, not from above or from inside the fluidized layer, but laterally, in the dead angles of the slopes, which are thus entirely renewed, either continuously or intermittently.

This under feed can be carried out either by a plunge piston or by screws traversing the lateral walls of the reactor.

Experience has shown that the use of falling banks has the advantage of avoiding the well known drawback of coating the lateral walls of the furnace with scoria.

What is claimed is:

1. In a process of producing chemcial reactions in granulated material, said reactions producing solid agglomerated masses, the steps of maintaining said granulated material in a fluidized layer by introducing a gas under an inclined conveyor supporting said layer, said conveyor emerging out of the top surface of said layer, feeding the granulated material on said layer and controlling the velocity of the gas to insure regular fluidization and to cause said solid agglomerated masses to settle on said conveyor and to be transported by said conveyor, which conveyor emerges with the solid agglomerated masses out of the top surface of said layer, while excluding from separation fluidized granulated material.

2. In a process of gasifying granulated carbonaceous material, said gasification producing solid agglomerated slag, the steps of maintaining said granulated carbonaceous material in a fluidized layer by introducing a gas under an inclined conveyor supporting said layer, said conveyor emerging above the top surface of said layer, feeding the granulated carbonaceous material on said layer and controlling the velocity of the gas to insure regular fluidization and to cause said solid agglomerated slag to settle on said conveyor and to be transported by said conveyor, which conveyor emerges with the solid agglomerated slag out of the top surface of said layer, while excluding from separation fluidized granulated carbonaceous material.

References Cited in the file of this patent

UNITED STATES PATENTS

| | | |
|---|---|---|
| 1,534,846 | Fraser | Apr. 21, 1925 |
| 1,861,452 | Rusby et al. | June 7, 1932 |
| 1,913,968 | Winkler | June 13, 1933 |
| 1,964,877 | Hereng | July 3, 1934 |
| 2,111,579 | Winkler et al. | Mar. 22, 1938 |
| 2,232,290 | Szikla et al. | Feb. 18, 1941 |
| 2,316,664 | Brassert | Apr. 13, 1943 |
| 2,480,670 | Peck | Aug. 30, 1949 |
| 2,506,542 | Caldwell | May 2, 1950 |
| 2,595,255 | Holder | May 6, 1952 |

FOREIGN PATENTS

| | | |
|---|---|---|
| 652,244 | France | Mar. 6, 1929 |